Patented Apr. 21, 1936

2,038,078

UNITED STATES PATENT OFFICE 2,038,078

PROCESS OF PURIFYING SULPHURIC ACID

William Hardiek, Baltimore, Md., assignor, by mesne assignments, to The Davison Chemical Corporation, Baltimore, Md., a corporation of Maryland No Drawing. Application November 15, 1932, Serial No. 642,815

5 Claims. (Cl. 23—172)

The present invention relates to the purification or refining of sulphuric acid, and while it has particular reference to sulphuric acid constituting a by-product of certain manufacturing operations, which acids contain soluble compounds of titanium, zirconium or hafnium, it is of course applicable to any sulphuric acid containing such impurities. As a specific instance the residual acid remaining after the manufacture of titanium oxide or hydroxide pigments or other pigments containing titanium compounds, from titanium ores such as ilmenite, rutile and the like, may be mentioned. The acids may contain any percentage of titanium up to their saturation value but ordinarily it runs about one to two percent of titanium compounds, perhaps titanyl sulphate were the acid is of about 20 to 30% strength. In many cases, for example, the manufacturers of titanium pigments find it impracticable to reconcentrate such acids, to the concentrations needed for attacking the titanium minerals. The presence of the titanium in this acid interferes with proper use of the same as dilute sulphuric acid, in certain industrial processes. The said acid may also contain other impurities, which may or may not be removable in accordance with the process of the present invention which is aimed particularly at the removal of the compounds of the metals mentioned above.

In accordance with the present invention I have found that it is easy to precipitate, in a readily removable condition, substantially the whole of the titanium compounds present, by proper treatment with phosphoric acid or a salt of phosphoric acid, and this result can be secured without any substantial dilution of the sulphuric acid under treatment.

After the removal of the titanium compounds the acid can be concentrated to any desired extent, or can be in some cases used or sold without further concentration.

The following examples are given as illustrative of the present invention, it being of course understood that the examples are given for the purpose of illustration and not as restricting the invention to the details of these examples.

*Example 1.*—Sulphuric acid constituting a waste product from the manufacture of titanium pigments, and containing about 1.5% of titanium compounds (probably titanyl sulphate) in solution, and being an acid of about 20 to 25% strength, (preferably warmed up to above 160° F., in order to give a more readily filterable precipitate) is added to ordinary superphosphate. In a particular case one ton of the acid in question was added to 121 pounds of high grade superphosphate containing 18% of available $P_2O_5$ and about 1% of insoluble $P_2O_5$, this being done in a lead lined tank having a powerful agitating device. The agitation was continued for about two hours after all of the sulphuric acid had been added, after which the stirring was discontinued, and the mixture allowed to stand for about 10 to 16 hours, the mass being kept warm, by a suitable heating jacket, the temperature during this part of the process being from 155 to 170° F. Then the liquid was decanted and filtered through a sand filter, and an examination of the same made. It was found that about 99% of all of the titanium present in the original solution had been precipitated, and the precipitate was in a condition to be readily retained upon a sand filter. Reference in the example to a ton, means a short ton or 2,000 pounds.

*Example 2.*—The procedure was as in Example 1, except that instead of the superphosphate, 67 pounds of phosphate rock containing 32% $P_2O_5$ (equivalent to 70% bone phosphate of lime or tricalcium phosphate) was employed.

*Example 3.*—The procedure was as in Example 1, but instead of superphosphate, syrupy phosphoric acid was employed, containing the equivalent of 23 pounds of $P_2O_5$. The precipitate obtained in this case was less bulky, but was found to contain substantially all of the titanium present in the original sulphuric acid used.

If the original sulphuric acid contains zirconium or hafnium, in the form of soluble compounds, these will be precipitated in the same manner.

It has been found during my researches, that the amount of phosphoric acid or phosphate may be varied. Even when adding about 75 to 80% of the above indicated amounts of phosphoric acid or phosphate, the precipitation of titanium may still be complete, following the process as given in the examples. It is possible in some cases, to use somewhat more than the above stated amounts of phosphoric acid or phosphate, when the presence of a small amount of phosphoric acid in the purified sulphuric acid is not objectionable.

The process is applicable, not only to sulphuric acid of about 20 to 25% strength, but also to acid weaker than this, and acid somewhat stronger than this.

Thus it has been found that satisfactory removal of titanium can be made from acid of 45%

$H_2SO_4$, though there appears to be a gradual dropping off of efficiency as the concentration increases. In treating acid of lower strength than 20% $H_2SO_4$ the efficiency of recovery improves.

The use of calcium phosphate or calcium acid phosphate as a source of the phosphoric acid radical of course introduces calcium, but the calcium is very largely precipitated in the form of calcium sulphate and this calcium sulphate appears to assist in clarifying the treated acid, apparently dragging down some of the finely divided titanium compounds precipitated.

The precipitate, after being washed and dried if desired, can be worked up for the production of titanium compounds. The titanium in the precipitate is soluble in concentrated sulphuric acid.

In the above examples reference is made to adding the sulphuric acid to the phosphate or phosphoric acid. This, and particularly in connection with the use of acid in a heated condition (illustratively given as about 160° F.), assists in producing the precipitate in a readily filterable condition, which condition is also assisted by letting the mixture stand, warm, for about 10 to 16 hours, after the completion of the chemical reaction, which reactions may require about 1 to 4 hours.

The phosphates may be added in several different forms, for example the following—

1. A slurry composed of phosphate rock dust and sulphuric acid as prepared for making superphosphate.
2. A slurry composed of low grade phosphate rock tailings or other compounds containing phosphates and acid as in (1).
3. Water extract of phosphoric acid and/or monocalcium phosphate from (a) superphosphate, (b) double superphosphate, (c) triple superphosphate.
4. Phosphoric acid of any desired concentration, preferably quite strong.
5. The addition directly to the sulphuric acid to be processed of (a) high grade phosphate rock, (b) phosphate rock tailings, (c) superphosphate, (d) double superphosphate, (e) triple superphosphate.

Ordinarily it is inadvisable to add mixtures containing considerable amounts of water, since such a procedure would dilute the sulphuric acid. In most cases it is desired to keep the sulphuric acid as concentrated as possible.

In adding the sulphuric acid to be treated, to the phosphate or phosphoric acid, it is advisable to well agitate during such addition, the sulphuric acid being run in rather slowly. The agitation is then continued for a long enough time to complete the reactions, which as above stated, may require 1 to 4 hours, depending upon temperature, form of the phosphoric acid and other factors.

I have definitely shown that the process is applicable, in the case of sulphuric acid containing even more than 25% actual $H_2SO_4$, or five times normal, by following the procedure as given herein, the precipitation of titanium being over 99% complete, and the precipitate being in a readily filterable condition. It is entirely feasible to commercially treat acid of somewhat over 25% concentration (over five times normal), the readily filterable condition of the precipitate being maintained by the step of adding the acid in a warm state to the phosphate, and preferably waiting 15 to 20 hours or longer, before the filtration.

I claim:—

1. A process of purifying spent sulphuric acid containing more than 20% free $H_2SO_4$ and also containing in solution the remnants of a compound of an element selected from the herein described group consisting of titanium, zirconium and hafnium, which consists in adding the said spent sulfuric acid solution to a compound containing a phosphate radical and filtering out the resultant precipitate.

2. A process of purifying spent sulphuric acid containing in solution the remnants of a compound of an element selected from the herein described group consisting of titanium, zirconium and hafnium, which consists in adding the said spent sulphuric acid in the proportion of substantially one ton to one hundred and twenty-one pounds of superphosphate, and thereafter separating the sulphuric acid from the resultant precipitate.

3. The process of substantially completely precipitating in filterable form titanium compounds from spent sulphuric acid, containing more than 20% free $H_2SO_4$, comprising heating the acid to 160° F. and adding it to a phosphate compound during violent agitation, the ratio of the sulphuric acid to the $P_2O_5$ being substantially in the order of 100 to 1 by weight.

4. The process as set forth in claim 3, where the phosphate compound is superphosphate.

5. The process as described in claim 3, where the agitation is continued from one to two hours after all the sulphuric acid has been added.

WILLIAM HARDIEK.